United States Patent [19]
Held

[11] Patent Number: 5,460,764
[45] Date of Patent: Oct. 24, 1995

[54] METHOD AND APPARATUS FOR MAKING HIGHLY DENSIFIED SHEETS

[76] Inventor: Kurt Held, Alte Strasse 1, 78647 Trossingen-Schura, Germany

[21] Appl. No.: 181,784

[22] Filed: Jan. 18, 1994

[30] Foreign Application Priority Data

Jan. 23, 1993 [DE] Germany .......................... 43 01 844.0

[51] Int. Cl.⁶ .......................... B29C 43/30; B29C 43/48
[52] U.S. Cl. .......................... 264/123; 156/555; 156/583.3; 156/583.5; 264/113; 264/119; 264/120; 264/122; 264/126
[58] Field of Search .......................... 156/555, 583.1, 156/583.3, 583.4, 583.5; 264/109, 112, 113, 115, 116, 119, 120, 122, 123, 125, 126, 134, 136

[56] References Cited

U.S. PATENT DOCUMENTS

| | | |
|---|---|---|
| 4,076,567 | 2/1978 | Yoshikawa et al. .................. 156/219 |
| 4,895,508 | 1/1990 | Held .................................. 425/371 |
| 5,145,626 | 9/1992 | Bastioli et al. ..................... 264/112 |
| 5,185,114 | 2/1993 | Held .................................. 264/83 |
| 5,330,595 | 7/1994 | Held .................................. 156/64 |

Primary Examiner—Robert A. Dawson
Assistant Examiner—Kenneth M. Jones
Attorney, Agent, or Firm—Klaus Bach

[57] ABSTRACT

In a method and apparatus for making highly densified compression sheets from thermoplastic polymeric compounds preferably together with reinforcement fiber mats in a continuous fashion in a double-band press in which the compound material is heated and compressed between two compression bands which extend between reversing inlet and outlet drums and define between adjacent sections a wedge-shaped precompression zone adjacent the inlet drums wherein the compound material is increasingly compressed and also heated and a final compression zone adjacent the precompression zone, wherein the compound is heated under pressure such that the thermoplastic melts and fully wets any fibers in the sheet and an end compression zone in which the sheet is cooled which the pressure is maintained and the compound material is retained in the space between the compression bands by seal bands extending along the side edges of the compression bands and maintained in sealing engagement therewith.

19 Claims, 12 Drawing Sheets

METHOD AND APPARATUS FOR MAKING HIGHLY DENSIFIED SHEETS

BACKGROUND OF THE INVENTION

The invention relates to a method and apparatus for making highly densified sheets preferably including long fiber glass mats and thermoplastic materials by densification of a thermoplastic granulate material layer with a granulate layer/final thickness ratio of >1.3:1.

It is known to soak glass, carbon, stone or mineral fiber mats or oriented fibers of organic duroplastic materials with molten thermoplastic material in order to produce therefrom usually plate-like semifinished products from which then various structural parts, for example, for lightweight cars, are made in molding presses. Such semifinished products have been known in the plastic processing industry under the designation Glas Mat Thermoplasts (GMT).

It is also known to spread granulate material of highly densified thermoplastic resin such as ethylvinylacetate or polyvinylchloride and melt it in double-band presses and density it to form floor and roof coverings. The state of the art for such products is described in EP 0046526.

The method according to the invention and the apparatus according to the invention will be described herein based on the example of glass mat thermoplastics (GMT) but the invention is not limited thereto. Other materials with a bonding matrix of thermoplastic polymers or duromeres with thermoplastic phases or duromere filter material mixtures such as urea glue coated wood chips for the manufacture of wood chip panels are within the scope of the present invention if their granulate layer/final thickness ratio, that is, the layer thickness before entering the gap between the inlet drums of the double-band press according to the invention and the final product thickness, exceeds the value of 1.3 and the final product is to have no air enclosures.

It is important that, during preparation of the thorough mixture of thermoplastic polymers and the fibers for the GMT, the fiber length and orientation is fully maintained during the impregnating procedure and that, on the other hand, the surfaces of the fibers are fully wetted by the molten thermoplastic material.

The state of the art is described, for example, by U.S. Pat. No. 955,956 and German Patent No. DP 2312816. In order to achieve full impregnation of the surfaces of the glass fibers for the continuous impregnation of the glass mats the prior art proposes to combine the mats, upon approaching the inlet drums of the double-band press, with cover films of thermoplastic material or to deposit such films on the press bands and to feed the reinforcement fibers as a sheet-like fleece between the films.

In the reaction zone of the double-band press these thermoplastic films and the fiber mats and a melt coating applied for example by extrusion are heated to such temperatures and densified under such pressures which result in the properties required for the subsequent use.

A well-known disadvantage of this process which, with the progress in manufacturing techniques, is increasingly objectionable resides in the high manufacturing costs for the cover sheets produced in a separate process and the complicated machinery required for feeding and guiding the sheets into the reaction zone. It is also disadvantageous that the sheet portion of the poly matrix has to be twice subjected to high temperatures.

Another disadvantage of GMT produced in accordance with the state of the art is the substantial content of air enclosed with the impregnation step which inhibits even warm-up in hot air ovens as a result of cavity formation and swelling up of the section being prepared for further processing.

It is therefore an objective to obtain semifinished GMT products with a density of up to 99% of the theoretical value, that is, which came close to the theoretical value by up to 0.1%, at which there are no air enclosures and each reinforcement fiber is enclosed in the resin matrix and wherein there is furthermore only a minimum amount of fiber breakage.

It is further desirable to provide for a higher fiber concentration in the outer layers in order to improve the flow characteristics during molding and the rigidity of the molded parts formed from the GMT.

It has been proposed in German Patent No. 3,347,877 to provide GMT in the form of a fabric to supply the resin matrix solely in the form of a solid sheet and to melt such package together in the reaction zone. In this process the reaction zone is limited along its sides by calibrated sealing wires capable of withstanding pressure whereas the still solid raw material package closes the inlet end and the already solidified GMT tightly closes the outlet end.

Although this process provides for GMT of very high density it requires twice the thermal conversion of the resin matrix which, in addition to submitting the resin of which the matrix consists to double thermal exposure, is also quite expensive. Furthermore, the length of the double-band press in relation to the GMT output per time unit is quite large because of the time required for heating the base materials to their melting temperature and the process is also for that reason relatively expensive.

SUMMARY OF THE INVENTION

In a method and apparatus for making highly densified compression sheets from thermoplastic polymeric compounds preferably together with reinforcement fiber mats in a continuous fashion in a double-band press in which the compound material is heated and compressed between two compression bands which extend between reversing inlet and outlet drums and define between adjacent sections a wedge-shaped precompression zone adjacent the inlet drums wherein the compound material is increasingly compressed and also heated and a final compression zone adjacent the precompression zone, wherein the compound is heated under pressure such that the thermoplastic melts and fully wets any fibers in the sheet and an end compression zone in which the sheet is cooled which the pressure is maintained and the compound material is retained in the space between the compression bands by seal bands extending along the side edges of the compression bands and maintained in sealing engagement therewith.

The novel method and the apparatus do not have these disadvantages. Impregnation is performed in the known manner in the double-band press. However, in accordance with the invention the double-band press includes a wedge-like inlet or precompression zone which is provided with a moving band side seal such that the pressure applied to the backside of the compression bands increases continuously with increasing densification over the wedge-like inlet zone without permitting the resin melt-fiber mixture to be squeezed out along the side edges of the compression bands thereby insuring full densification over the full width of the GMT. Densification up to values >99% is achieved particularly by providing in the reaction zone, which follows the wedge-like precompression zone, a large isobaric pressure of such values that the desired 99% of the theoretically possible density of the respective GMT is achieved.

In accordance with the method according to the invention a reinforcement fiber material is supplied to a double-band press as shown in FIG. 1 in one or more sheets and one or more melt films are deposited between the sheets in such a manner that the flow of the melt, which is formed in a scroll-type extrusion apparatus with a wide Slot-nozzle and adjusted to the heating or cooling requirements of the double-band press, that is, to its band speed, provides for a GMT with the desired fiber content.

Further, the fiber fleeces entering the apparatus are heated in the wedge-like precompression zone and in a part of the parallel isobaric compression zone to temperatures which provide fop optimal melt viscosity for the wetting of each and every fiber.

Impregnation experiments have shown that, surprisingly, at high pressures and as a result of the low viscosity of the melt at the high temperature, increased amounts of enclosed air can be resorbed by the melt, that is, the resorption of air enclosed in the melt and the fiber material increases proportionally with pressure.

This effect is important for two reasons: After solidification of the resin melt-fiber mixture desorption of the resorbed originally trapped air is only possible at the surface of the GMT plates and since such a process extends over long periods of days or weeks it will not lead to the formation of pores or cavities in the GMT.

A further result of this surprising tact is that air enclosures which normally would form directly adjacent the surfaces of the compression bands if the follow-up compression pressures in the final compression zone adjacent the wedge-like precompression zone are <N/cm$^2$, will completely disappear under adiabatic compression it the pressures in the final compression zone are above 150 N/cm$^2$ and the reinforcement fibers will be completely wetted.

It can be safely assumed that the heat energy generated by the adiabatic compression of the air enclosures increases the temperature level of the surrounding polymer melt which results in a desirable localized further reduction of the viscosity of the melt which facilitates complete wetting of the fibers.

In accordance with this invention the content of the reaction zone is then, toward the exit of the final compression zone, cooled by cooled pressure plates where heat is removed from the content by intensive cooling of the back sides of the compression bands while the compression pressure is maintained until a temperature level is reached at which the then solid GMT plates can be removed from the compression bands at the exit drums.

DESCRIPTION OF PREFERRED EMBODIMENTS

Figure 1:
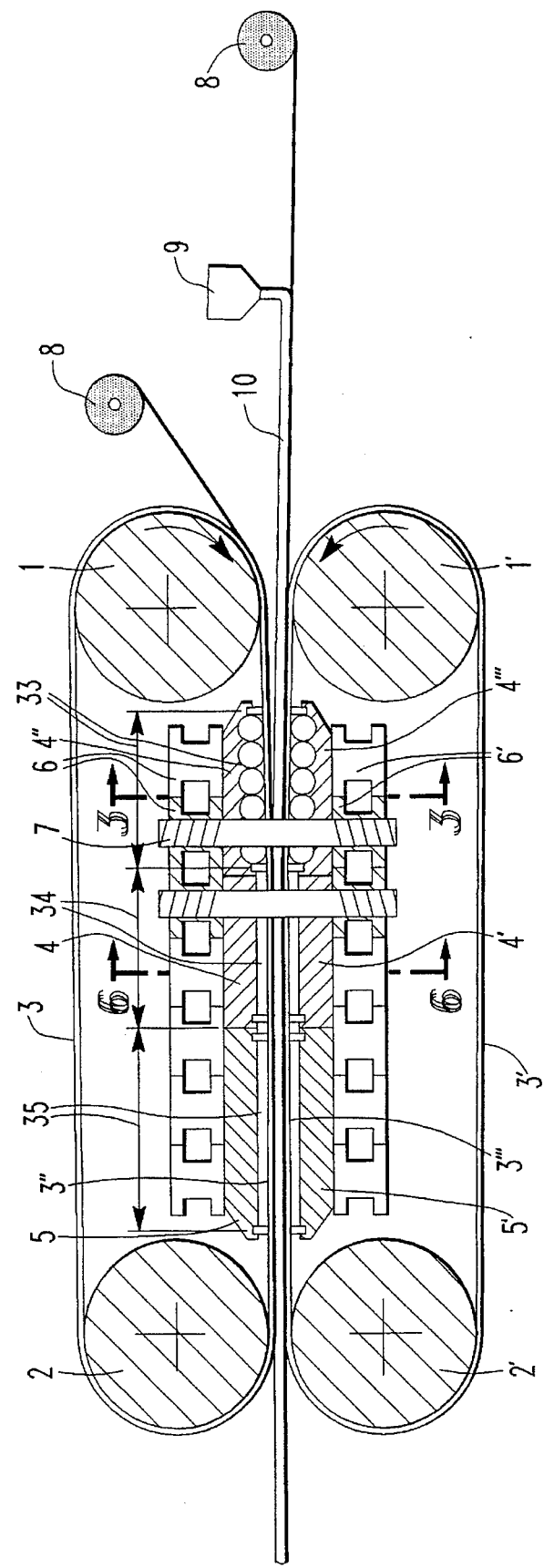
FIG. 1 is a schematic view of a double-band press according to the invention.

As shown in FIG. 1 the double-band press comprises inlet drums 1 and 1' and exit drums 2 and 2' over which compression bands 3, 3' extend and which have oppositely disposed band sections 3", 3'" which extend between heated pressure plates 4, 4' and 4", 4'" and cooled pressure plates 5, 5'. The pressure plate pairs 4, 4' and 4",4'" and 5 and 5' are mounted on support beams 6, 6' which are combined, by means of only partially shown screw jacks 7 so as to form the support structure for the double-band press.

While the pair of compression plates 4",4'" is equipped with stationary rotatable rollers for isochoric mechanical press band support the pairs of pressure plates 4, 4' and 5, 5' include isobarically operative pressure pads for generating high pressures in excess of 150N/cm$^2$ as disclosed in German Patent No. 2,953,078.

Reinforcement fiber sheets disposed on material rolls 8, for example, as fleeces, are taken from the rolls and pulled by the driven compression bands 3, 3' into the reaction zones 33, 34, 35. A wide slot nozzle structure 9 is provided on top of the lower fiber sheet rolled of the lower material roll 8 and a resin provided by a scroll-type extrusion press is deposited onto the lower fiber sheet as a melt film 10. The wide slot nozzle is open toward the upper side of the lower reinforcement fiber sheet 8 onto which the extruded melt film is deposited.

Figure 2:
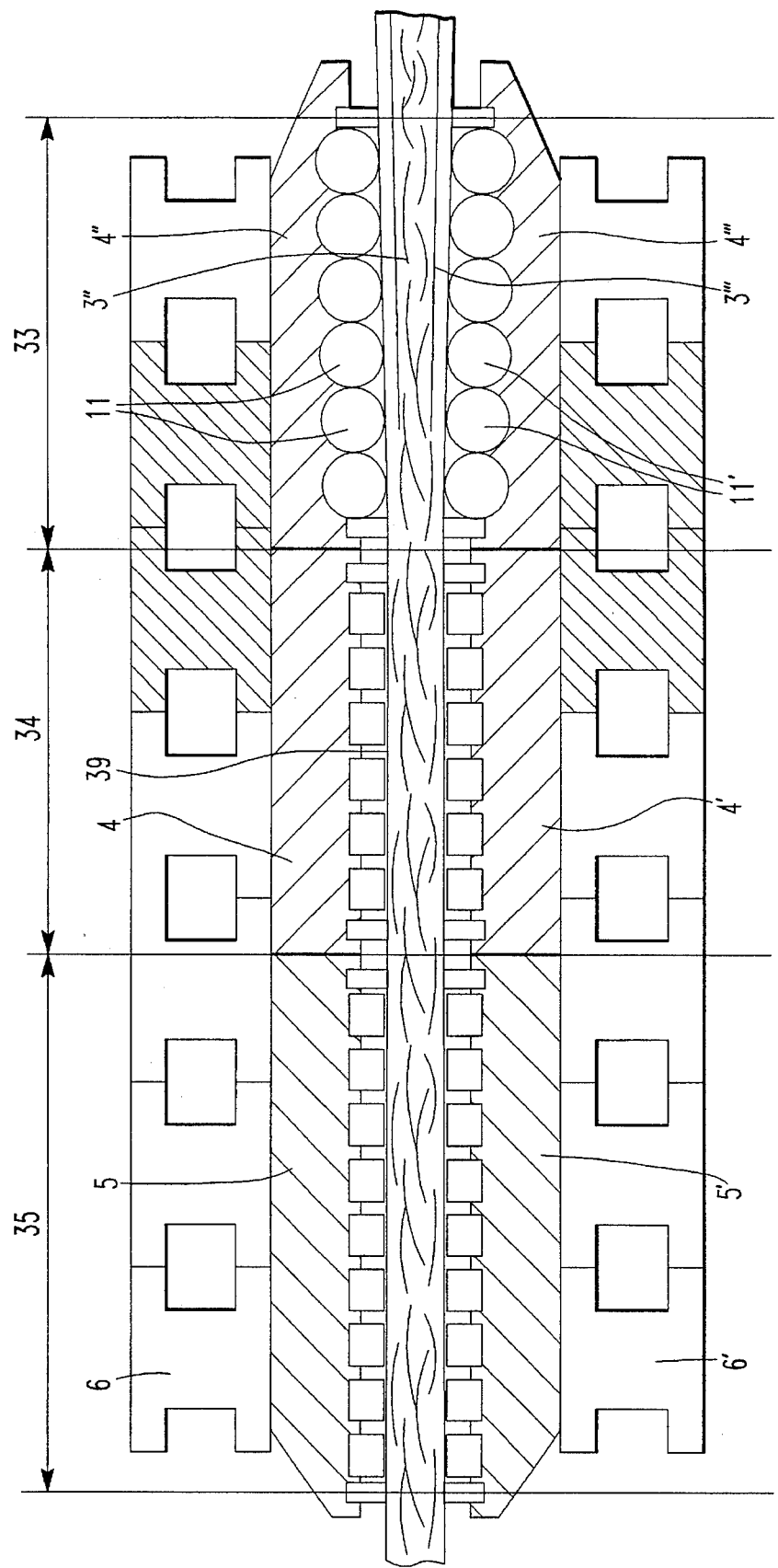
FIG. 2 shows the wedge-shaped initial and the final compression zones of the double-band press.

FIG. 2 which represents only a section of FIG. 1 shows the wedge-shaped isobaric heated precompression zone 33 with the pressure plates 4",4'" and the stationarily support rotatable support rollers 11, 11" as they are for example provided also in the arrangement according to German Patent No. 3,135,031, which provide support for the compression bands 3, 3' in the sections 3"—3'" and take up the compression forces which increase with increasing densification of the reaction zone content 39 in the predensification zone 33.

Following the precompression zone 33 with isochoric support for the compression bands 3", 3'" is the final compression zone 34 with isobaric support of the compression bands which like shown for example in DEO 3921364 can be heated or, selectively, cooled and finally, an end compression zone also with isobaric compression band support wherein however only cooling takes place.

The increasing densification in the wedge-like precompression zone 33 and the resulting increasing pressure are the basic reasons why a high pressure can be maintained in the subsequent final compression zone 34 with isobaric support and why, in spite of the high pressure, the liquid molten resin fiber mixture content 39 of the final compression zone does not flow back toward the open inlet end of the wedge-like precompression zone 33. Backflow of the resin melt-fiber mixture would have catastrophic consequences since even small backflow amounts would rapidly accumulate and finally would produce pressures which could not be withstood by the compression band support structure or the side seals in the precompression zone and would lead to a collapse of the process.

Figure 3:
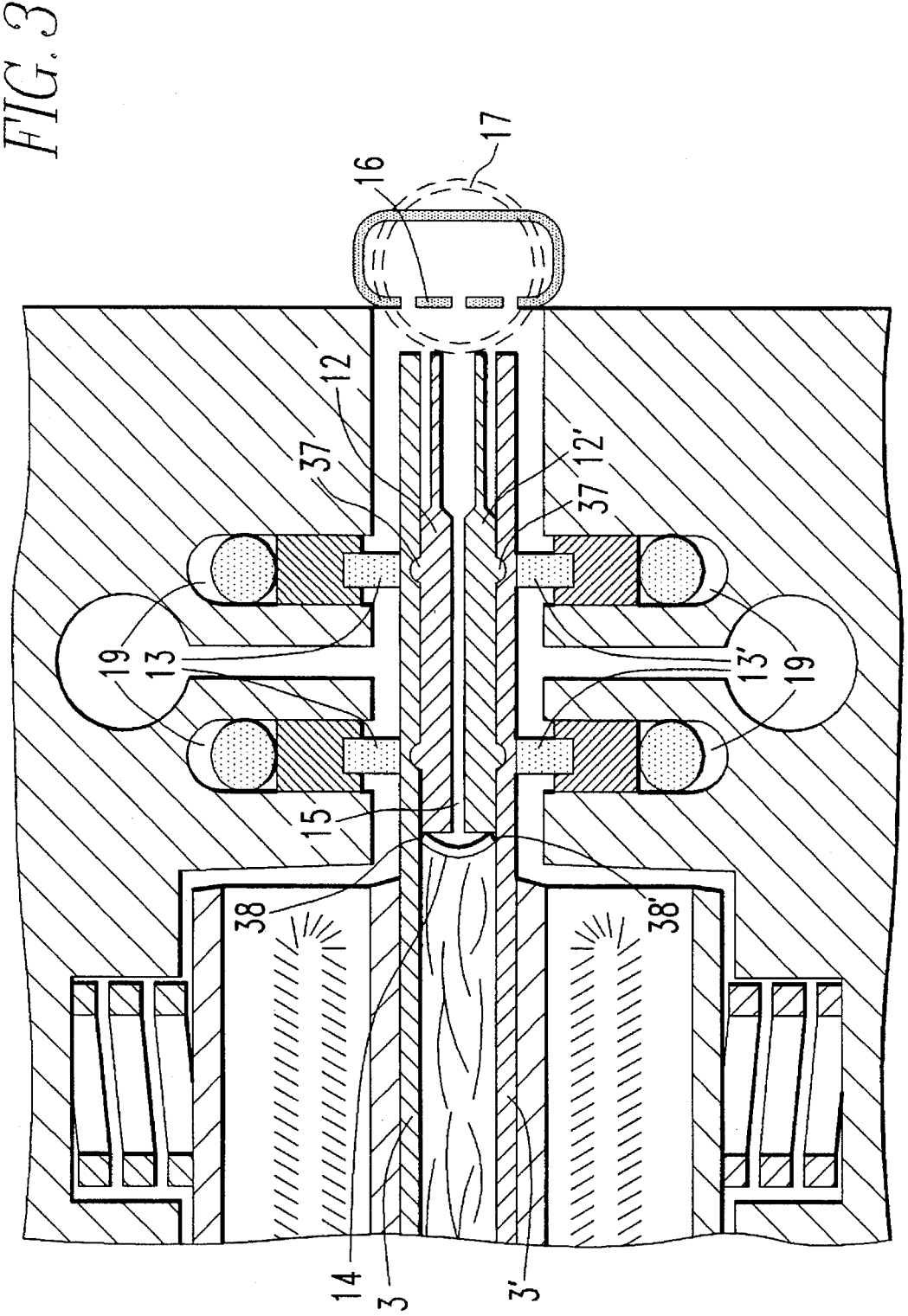
FIGS. 3 and 4 are a cross-sectional view taken along line 3—3, of FIG. 1.

FIG. 3 shows a side sealing structure with calibrated seal bands 12 and 12' running along the sides of the compression bands to seal the gap 15 therebetween. The compression bands 3, 3' have grooves formed in their surfaces and the seal bands 12 have guide beads 37 which are received in the grooves of the compression band for retaining the seal bands in proper position while they move around the drums 1 and 2 and 1' and 2' together with the compression bands. However since the seal bands 12, 12' cannot hermetically seal the wedge-like precompression zone area, plastically deformable solid seal elements 14 are carried along which contain the melt film fiber mixture and which can adapt to the progressing height reduction in the precompression zone.

Figure 4:
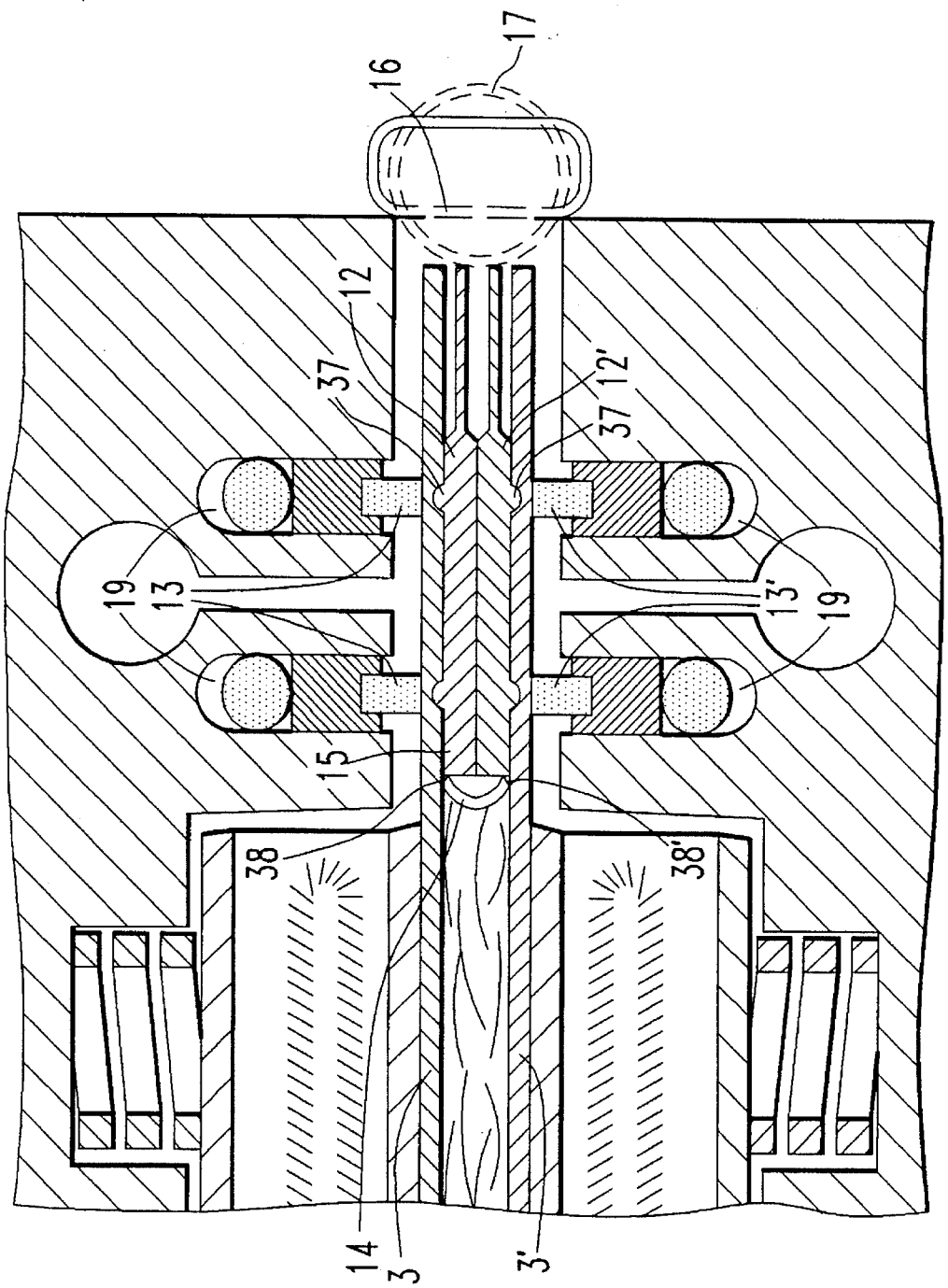

FIG. 4 which represents a cross-section taken along line B—B' of FIG. 1 shows the geometry of the reaction zone seal arrangement: The seal bands 12 and 12' are fully pressed together by the pressure forces which are applied by the slide seal structures 13, 13' and are generated hydraulically by admission of pressurized fluid to the space 19 behind elastomeric seals disposed behind the slide seal structures 13, 13'. The seal element 14 has adjusted to the reduced height of the reaction zone in the cross-sectional area B—B by bending while maintaining a seal with regard to the resin melt-fiber mixture at 38, 38'.

As shown in FIGS. 3 and 4 the seal bands 12 and 12' are provided with cooling ribs which extend outwardly from the seal bands and which are of reduced thickness to provide space for pressurized cooling air or a pressurized air-water mixture which is supplied via a duct 17 and discharged through the bores 16 for intense cooling of the seal bands.

Figure 5:
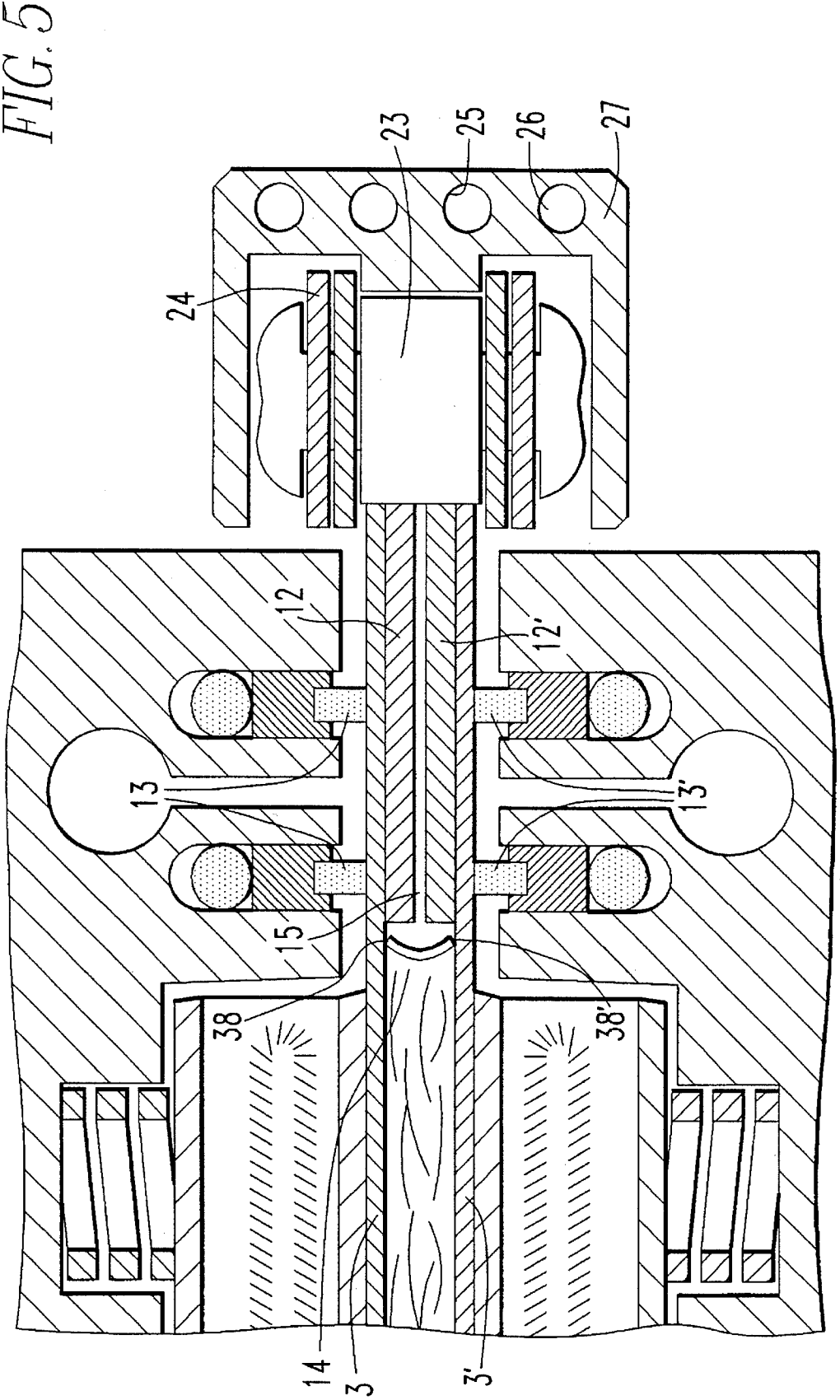
FIG. 5 is a cross-sectional view also taken along line A—A' showing a particular press band edge seal arrangement.

FIG. 5 shows an embodiment for the side sea structure wherein the calibrating seal bands 12, 12' moving along the sides of the compression bands 3, 3' do not have guide beads 37 but are held in position by the rollers 23 of a roller chain 24 which moves at half the speed of the compression bands wherein the rollers firmly engage the sides of the seal bands for retaining and, at the same time, cooling them, the chain rollers being supported and cooled by a guide track 27 provided with passages 25 through which a coolant 26 is circulated. The guide track 27 is supported so as to be pressed onto the rollers 23 of the roller chain 24 in a resilient manner by support means which are not shown in the drawing.

Figure 6:
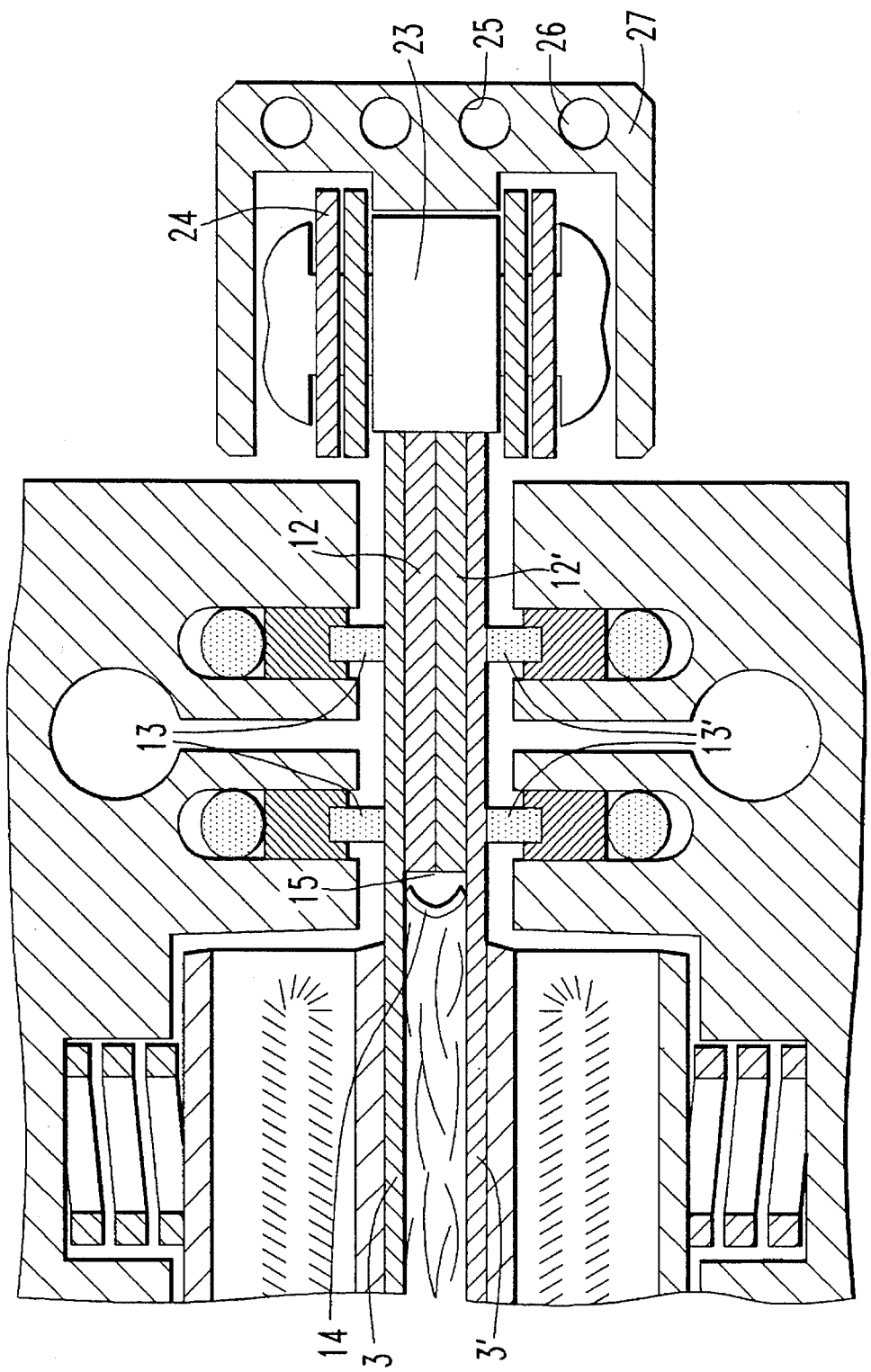
FIG. 6 is a cross-sectional view along line 6—6 showing a particular side seal arrangement.

FIG. 6 shows the arrangement of FIG. 5 in the cross-sectional area B—B' in which the material between the compression bands is fully densified and the side seals have moved fully together as described in connection with FIG. 4.

Figure 7:
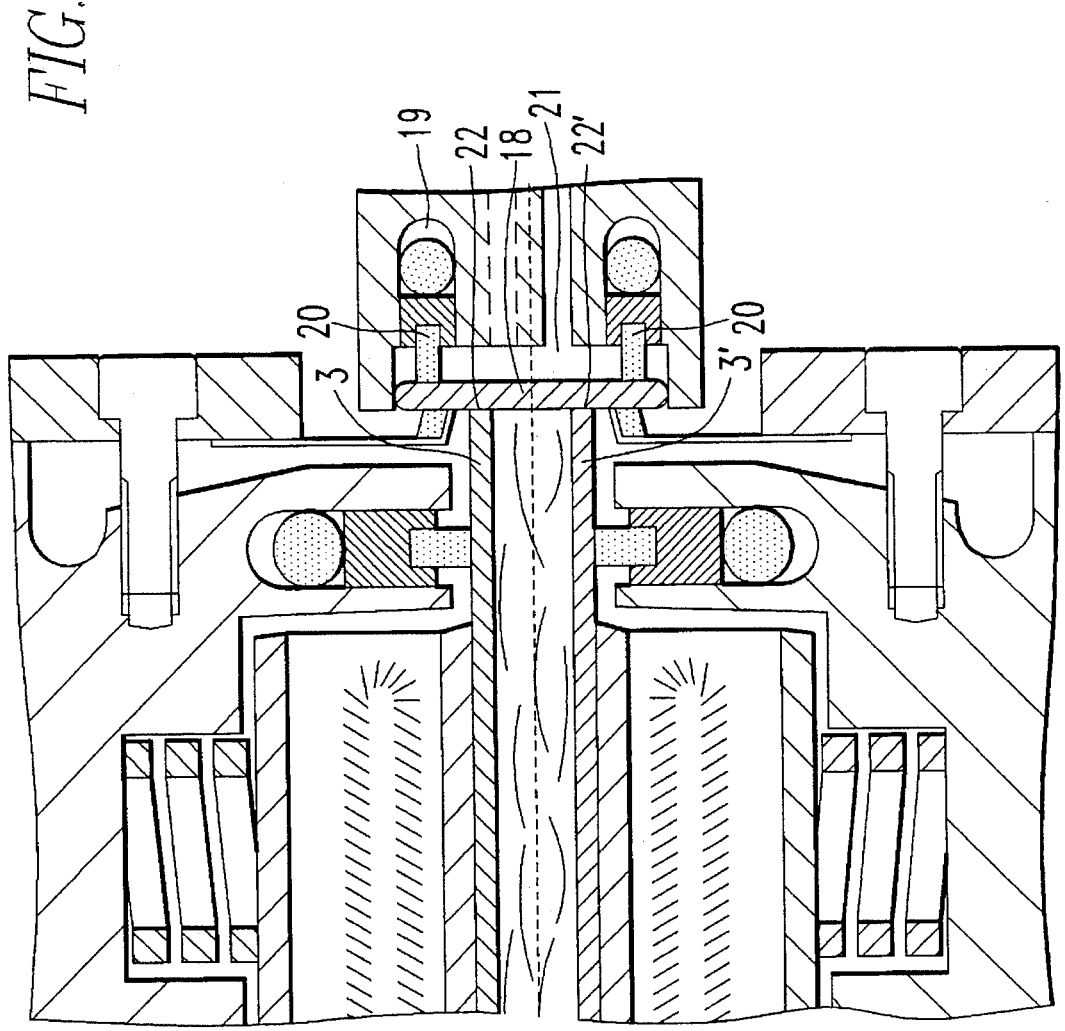
FIG. 7 is a cross-sectional view along line 3—3 showing a preferred side seal arrangement cooled seal bands.

FIG. 7 shows another embodiment for the side seal structure which includes side seal bands 18 which extend over the full length of the apparatus, that is, over the precompression and the final and end compression zones 33, 34 and 35 and which are pressed onto the side edges of the compression bands 3, 3' by slide seals 20 which are pressed onto the seal bands 18 by a pressurized fluid. The pressurized fluid and pressurized fluid admitted to the sealed space 21 behind the side seal bands 18 is preferably water or another fluid whose leakage causes no problems when vaporizing and which, circulated in appropriate amounts, is capable of cooling the seal band 18 to such a degree that the resin melt-fiber mixture immediately solidifies upon entering a gap 22 between the compression band edges and the side seal band so as to seal this area against the surrounding atmosphere and retain the highly pressurized melt material between the compression bands.

Figure 8:
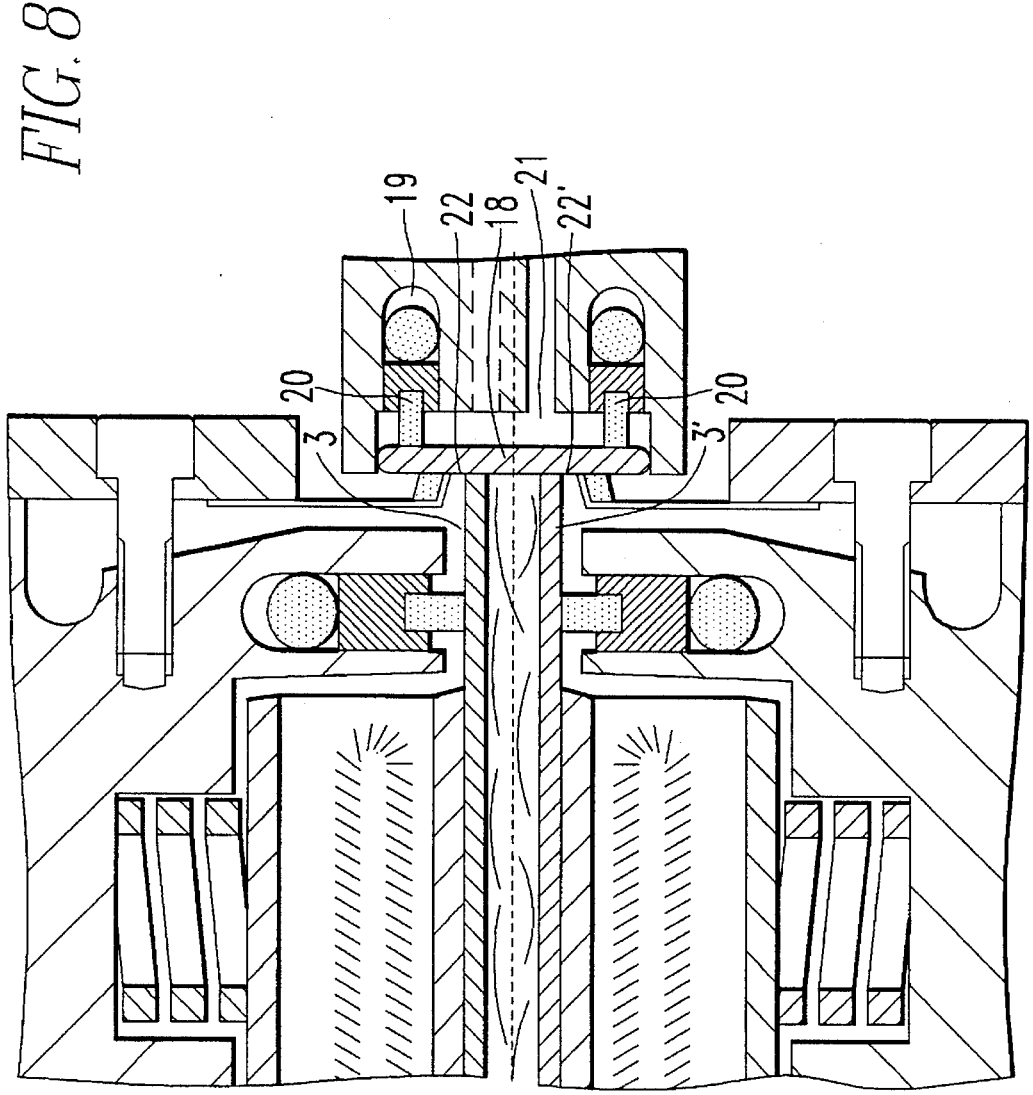
FIG. 8 shows a side seal arrangement in a cross-section taken along lines 6—6.

FIG. 8 shows the arrangement of FIG. 7 in the cross-sectional area B—B in which the material between the compression bands is fully densified and the compression bands have moved closer together. Sealing is achieved in the same manner as described in connection with FIG. 7.

Figure 9:
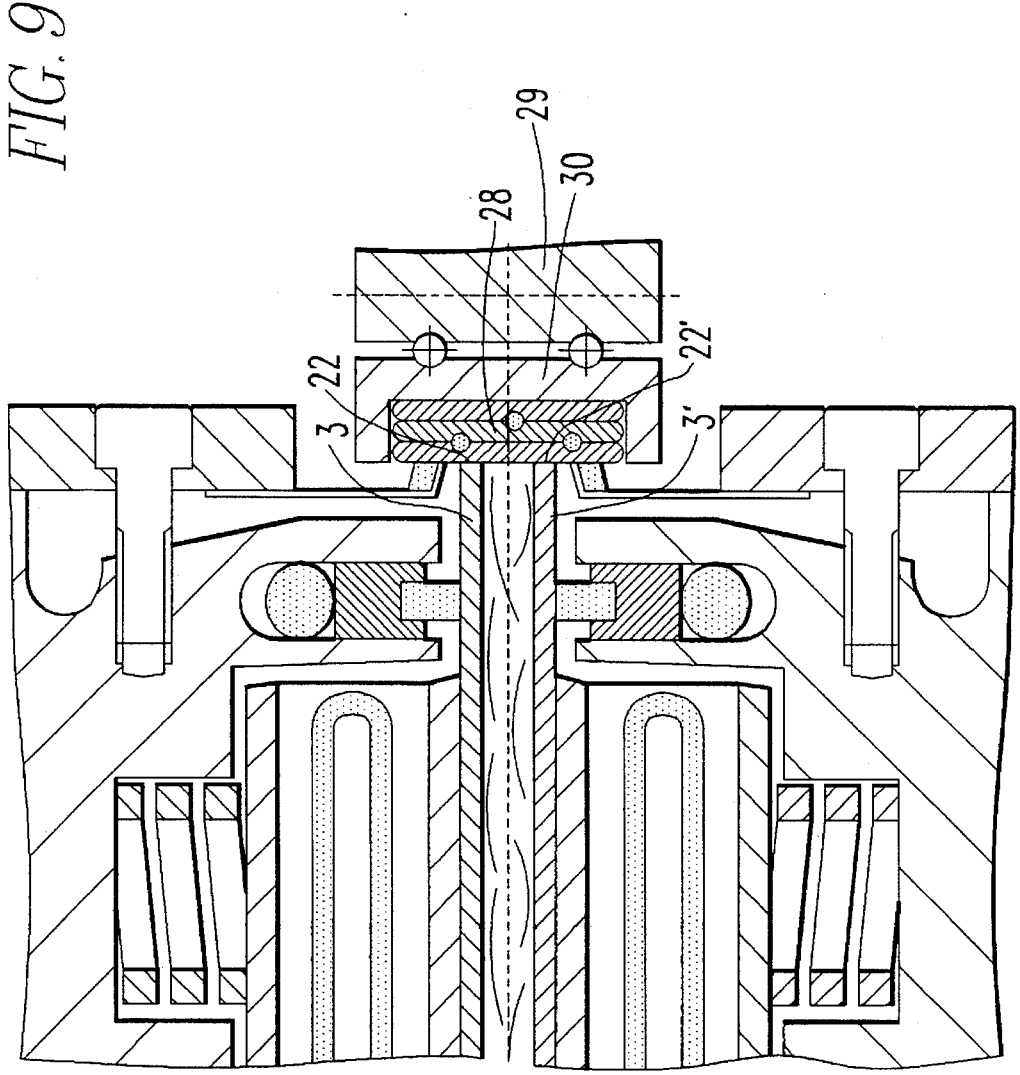
FIG. 9 shows a triple band side seal structure.

FIG. 9 shows a three-layer seal band structure 28 corresponding to one as disclosed in German Patent No. 2,735,142 wherein guide rollers 30 rotatably supported by shaft bolts 29 press the seal band structure 28 into firm engagement with the side edges of the compression bands 3, 3'. In this embodiment, direct cooling of the seal band structure is not required, rather indirect cooling of the seal band structure away from the reaction zone is utilized since the heat capacity of the seal band structure is high enough to insure solidification at the GMT edges for maintaining a seal against the melt pressure with regard to the surrounding atmosphere.

Figure 10:
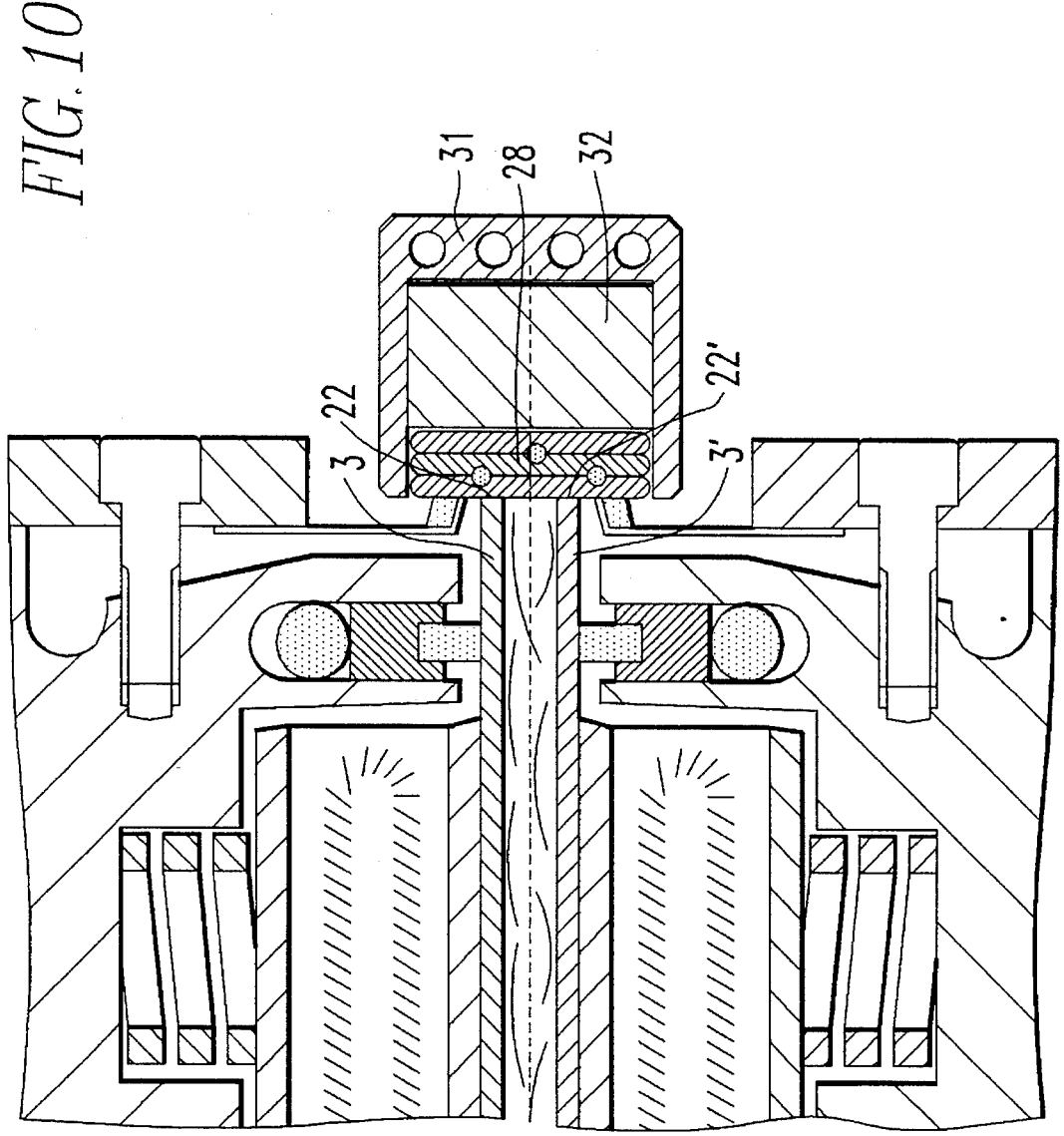
FIG. 10 shows an arrangement similar to that of FIG. 9 but with cooled guide tracks.

FIG. 10 shows a three-layer seal band structure 28 also corresponding to one disclosed in German Patent No. 2,735,143 wherein however the seal band structure 28 is pressed against the edges of the compression bands 3, 3' by rollers 32 rolling in a cooled guide track 31 with half the speed of the compression bands 3, 3'. In this arrangement, the high heat capacity of the seal band structure 28 can be combined with cooling of the guide track 31 for high combined cooling effects. Support structures for the guide track are not shown in FIG. 10 like in FIG. 5; the cooling principle is the same as described in connection with FIG. 5.

Any of the seal arrangements described will provide proper sealing in the wedge-shaped precompression zone: In the arrangements of FIGS. 7–10 the edges of the compression bands 3, 3' slide inwardly on the surfaces of the side seal bands 18 and the seal band structure 28 at the rate at which the wedge shape of the precompression zone reduces the distance between the compression bands 3, 3'. At the same time, sealing functions are fully maintained since the gap 22, 22' remains cooled over its full length so that any resin melt-fiber mixture entering such gap will immediately solidify and become self-sealing.

Experience has shown that the temperature of the material between the compression bands increases rapidly from the seal areas 22, 22' toward the center of the resin melt-fiber mixture material so that the density of the solidified material adjacent the seal areas 22, 22' is relatively low and it can be mechanically compressed pressed without excessive force requirements and without adversely affecting the sealing capabilities.

Figure 11:
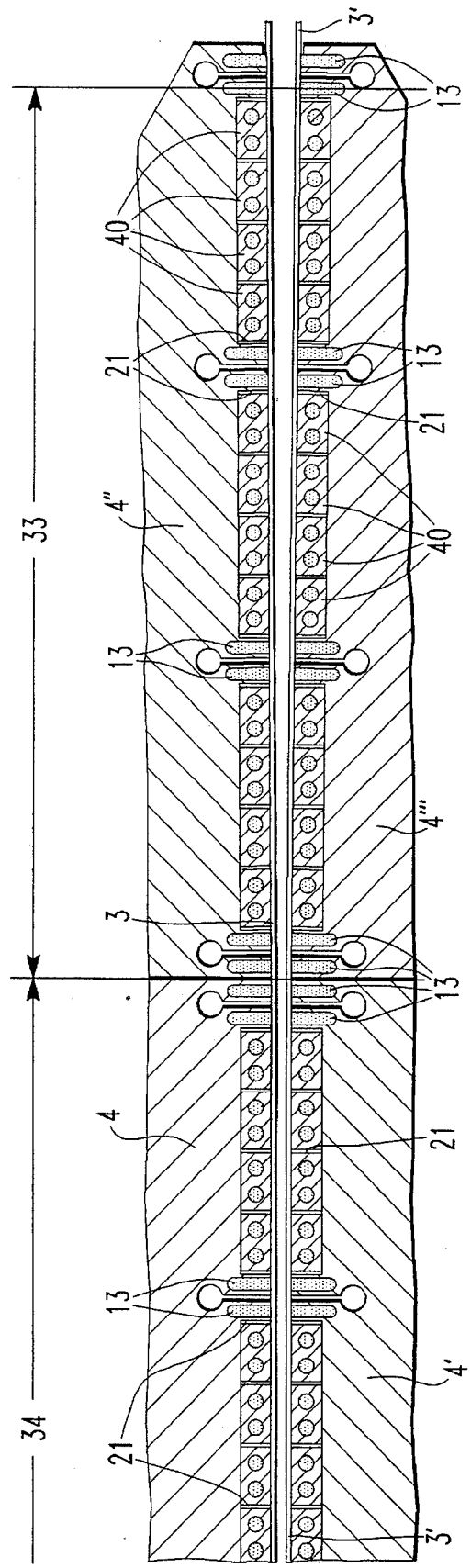
FIG. 11 shows the reaction zone with slide supports for the compression bands.
Figure 12:
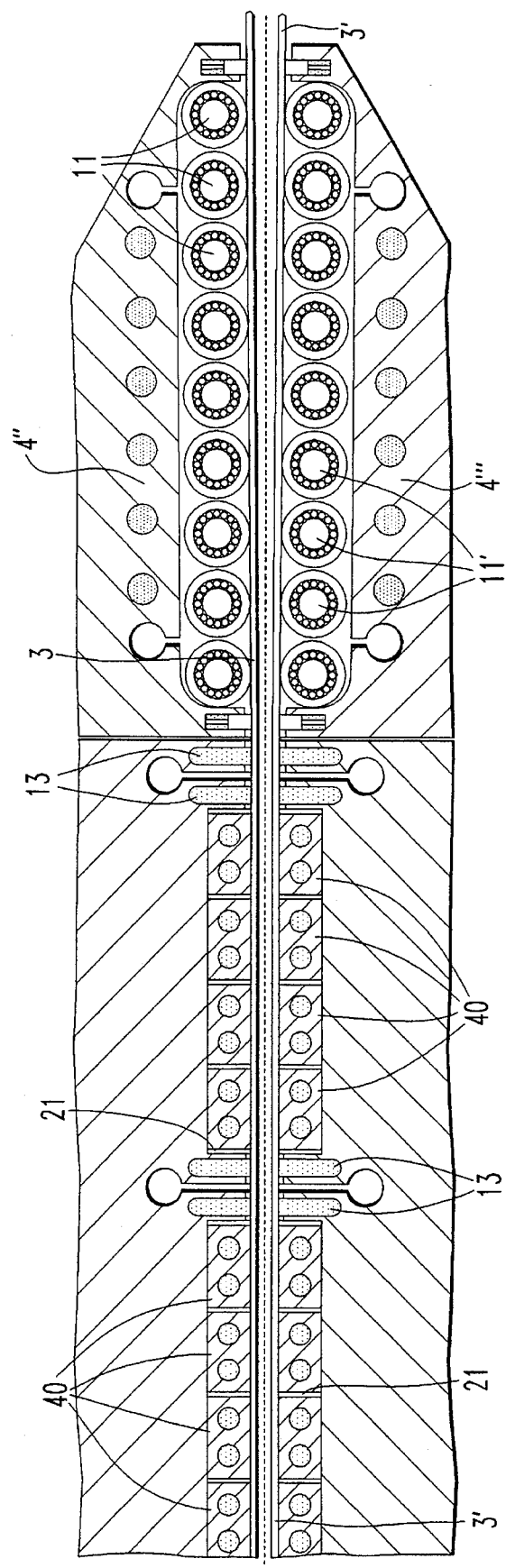
FIG. 12 shows the reaction zone with roller supports for the compression bands.

FIGS. 11 and 12 show the reaction zones of double-band presses according to the invention which, with wedge-shaped precompression zones with isochoric, isobaric or combined isochoric and isobaric compression band supports, provide for the realization of the method according to the invention For the manufacture of GMT with a density up to and larger than 99% of the theoretical value.

In the arrangement of FIG. 11 the isobaric support for the compression bands 3, 3' as required for the increasing resin melt-fiber mixture pressures is provided by pressure pads 40 which are filled with pressurized fluid and separated by slide seals 13 wherein the pressure of the pressurized fluid in the pressure pads 40 is successively higher from the inlet end to the outlet end of the precompression zone.

| LISTING OF REFERENCE NUMERALS | |
|---|---|
| 1, 1' | Inlet drums |
| 2, 2' | Exit drums |
| 3, 3' | Compression bands |
| 3", 3'" | Band sections |
| 4, 4', | |
| 4", 4'" | Heated pressure Plates |
| 5, 5' | Cooled pressure plates |
| 6, 6' | Support beams |
| 7 | Screw jack |
| 8 | Material roll |
| 9 | Wide slot nozzle structure |
| 10 | Melt film |
| 11, 11' | Support rollers |
| 12, 12' | Seal bands |
| 13, 13' | Slide seal structures |
| 14 | Seal elements |
| 15 | Gap |
| 16 | Bores |
| 17 | Duct |
| 18 | Side seal band |
| 19 | Space behind seals |
| 20 | Slide seal |
| 21 | Sealed space |
| 22, 22' | Gap |
| 23 | Roller |
| 24 | Roller chain |
| 25 | Passage |
| 26 | Coolant |
| 27 | Cooled guide track |
| 28 | Seal band structure |
| 29 | Shaft bolt |
| 30 | Guide roller |
| 31 | Cooled guide track |
| 32 | Rollers |
| 33 | Wedge-like precompression zone |
| 34 | Heated final compression zone |
| 35 | Cooled end compression zone |
| 37 | Guide beads |
| 38, 38' | Seal areas |
| 39 | Reaction zone content |
| 40 | Pressure pads |

What is claimed is:

1. A method for the manufacture of highly densified sheets of thermoplastic polymer material in a double-band press in which the polymers are heated under pressure while being moved through the press between two compression bands, said method comprising the steps of:

evenly distributing the material and moving it into a wedge-shaped precompression zone between said compression bands; said material being moved between the compression bands in the precompression zone by friction with the compression bands which are arranged at such a small angle that the friction in the wedge-shaped space formed thereby is sufficient to draw the material into the narrowing space between the compression bands where it is compressed thereby before it enters a final compression zone while the material is held between the compression bands by seal structures extending along the side edges of the compression bands to prevent outflow of the compressed material from the space between the compression bands; heating said material in said precompression zone; providing, with increasing distance from the inlet to said precompression zone, increasing compression pressures on said compression bands for gradually densifying the material in said precompression zone until a final pressure is reached at the transition from said precompression zone to said final compression zone; maintaining said final pressure and further heating said material in said final compression zone for fusing said material together in said final compression zone; and, in an end compression zone in which said final pressure is maintained, cooling said material such that the material leaves the end compression zone as a solid sheet of highly densified material.

2. A method according to claim 1, wherein said material comprises a mixture of thermoplastic polymers and reinforcement fibers comprising at least one of glass fibers, carbon fibers, duroplastic fibers, natural fibers, wood chips and plant fibers.

3. A method according to claim 2, wherein said thermoplastic material is evenly distributed on a reinforcement fiber sheet on which it is moved into said precompression zone and with which it is fused together to provide a solid fiber-reinforced sheet.

4. A method according to claim 1, wherein said material comprises particulate thermoplastic polymers which are compressed and fused together between said compression bands.

5. A method according to claim 4, wherein said material comprises multicolored particulate material for producing floor coverings.

6. A method according to claim 1, wherein said seal structures are cooled flow of the heated compressed material from the space between the compression bands.

7. A method according to claim 1, wherein said thermoplastic polymer is placed onto a first reinforcement fiber material sheet and another reinforcement fiber material sheet is placed on top of said thermoplastic polymer to form a layered structure which is drawn into said wedge-shaped precompression zone wherein said layered structure is compressed and heated to melt the thermoplastic polymer which, under pressure and heat, fully wets said reinforcement fibers and said layered structure is finally cooled while maintained under pressure to provide a high-density fiber-reinforced resin sheet.

8. A double-band press apparatus for the manufacture of compression sheets of materials which are highly densified in said apparatus and include thermoplastic materials which are heated while they are passed through said apparatus, said apparatus comprising upper and lower endless compression bands extending between upper and lower reversing inlet and outlet drums, said drums being supported on a press stand in spaced relationship such that a space is formed between adjacent sections of said upper and lower compression bands between which said compression bands are moved through said apparatus, compression means located on the inner sides of said adjacent sections of said compression bands and including pressure plates having heating and cooling means for compressing said compression band sections and, at the same time, heating or cooling them, said compression bands being spaced further apart at the inlet end so as to provide a wedge-shaped precompression zone into which said material is drawn by said compression bands and where it is heated and exposed to increasing pressure, a final compression zone in which said material is further heated while maintained under isobaric compression and an end compression zone in which said material is cooled while said isobaric compression is maintained, and side seal bands extending along the sides of said compression bands and having means for forcing said side seal bands into sealing engagement with the side edges of said compression bands so as to seal off the space between them for retaining said material under pressure within said space and means for cooling said side seal bands for immediately solidifying any molten material if squeezed into the seal interface between said side seal bands and the side edges of said compression bands.

9. An apparatus according to claim 7, wherein said compression means in said wedge-shaped precompression zone includes rollers rotatably supported on said press stand adjacent said compression bands so as to support said compression bands in said precompression zone.

10. An apparatus according to claim 8, wherein said compression means in said wedge-shaped precompression zone includes a number of pressure pads containing pressurized fluid which is maintained, with increasing distance from the inlet end of the wedge-shaped precompression zone, under increasing pressure.

11. An apparatus according to claim 8, wherein in said final compression zone said compression bands are supported in parallel spaced relationship and said compression means include means for selectively heating or cooling said compression bands.

12. An apparatus according to claim 8, wherein said seal bands are disposed between the side edge portions of said compression bands, said sealing bands having circumferential beads and said compression bands having corresponding grooves receiving said beads for retaining said sealing bands in proper position relative to said compression bands and deformable seal elements disposed adjacent said seal bands in contact with said compression bands so as to seal said compression space independently of the size of the gap between the compression bands, and means for cooling said seal bands.

13. An apparatus according to claim 12, wherein said seal bands are provided with cooling ribs and a duct structure extends along said seal bands for supplying a coolant to said cooling ribs.

14. An apparatus according to claim 12, wherein track structures extend along the sides of said seal bands and roller chains are disposed between said track structures and said seal bands so as to provide side support to said seal bands.

15. An apparatus according to claim 8, wherein said side seal bands extend over the full length of the apparatus adjacent the side edges of said compression bands.

16. An apparatus according to claim 15, wherein said means for forcing said seal bands into engagement with the side edges of said compression bands include sealing means engaging said seal band along its side opposite said compression band edges and defining adjacent thereto a space supplied with a pressurized cooled fluid for forcing said seal bands in engagement with the edges of said compression bands and, at the same time, cooling said seal bands.

17. An apparatus according to claim 15, wherein said means for forcing said seal bands into engagement with the side edges of said compression bands are rollers mounted on guide rails extending along said seal bands and engaging said seal bands.

18. An apparatus according to claim 17, wherein said rollers are cooled for cooling said seal bands.

19. An apparatus according to claim 17, wherein said seal bands include a number of layers to provide for increased stability between adjacent rollers and for increased heat capacity.

* * * * *